(12) United States Patent
Andreev et al.

(10) Patent No.: US 11,164,165 B1
(45) Date of Patent: Nov. 2, 2021

(54) MULTI-ASSET BLOCKCHAIN NETWORK PLATFORM

(71) Applicant: Chain, Inc., San Francisco, CA (US)

(72) Inventors: Oleg Andreev, Alameda, CA (US);
Adam Reese Ludwin, San Francisco, CA (US); Devon Gundry, Oakland, CA (US); Ryan Robert Smith, San Francisco, CA (US); Keith Allen Rarick, San Francisco, CA (US)

(73) Assignee: Greenberg & Lieberman, LLC, Washington, DC (US)

( * ) Notice: Subject to any disclaimer, the term of this patent is extended or adjusted under 35 U.S.C. 154(b) by 0 days.

(21) Appl. No.: 15/483,909

(22) Filed: Apr. 10, 2017

Related U.S. Application Data

(60) Provisional application No. 62/411,460, filed on Oct. 21, 2016, provisional application No. 62/320,376, filed on Apr. 8, 2016.

(51) Int. Cl.
*G06Q 20/06* (2012.01)
*G06Q 20/38* (2012.01)

(52) U.S. Cl.
CPC ..... *G06Q 20/0655* (2013.01); *G06Q 20/3829* (2013.01)

(58) Field of Classification Search
None
See application file for complete search history.

(56) References Cited

U.S. PATENT DOCUMENTS

| | | | | |
|---|---|---|---|---|
| 2009/0106149 A1* | 4/2009 | Bennett | .................. | G06Q 20/10 705/42 |
| 2013/0046684 A1* | 2/2013 | Driemeyer | ............. | G06Q 10/10 705/39 |
| 2015/0332395 A1* | 11/2015 | Walker | .................. | G06Q 20/06 705/69 |
| 2016/0028552 A1* | 1/2016 | Spanos | ................. | H04L 9/3297 713/178 |
| 2016/0191243 A1* | 6/2016 | Manning | ................... | H04L 9/32 713/168 |

(Continued)

OTHER PUBLICATIONS

Maxwell, Gregory, "Confidential Transactions," Jun. 16, 2015 [retrieved online at https://www.weusecoins.com/confidential-transactions/ on Jun. 20, 2017].

*Primary Examiner* — Jacob C. Coppola
*Assistant Examiner* — Jason B Fenstermacher
(74) *Attorney, Agent, or Firm* — Michael L. Greenberg, Esq.; Greenberg & Lieberman, LLC

(57) ABSTRACT

A multi-asset blockchain network platform is disclosed for defining a plurality of different assets, the plurality of different assets including at least a first digital asset of a first asset type and second asset of a second asset type, each of the first and second asset types including a respective asset identifier corresponding to a respective issuance program defining rules for issuing units of the respective asset on a blockchain. A plurality of accounts are created, the plurality of accounts including at least a first account and a second account. Asset units of the first digital asset are issued to the first account. Asset units of the second asset are issued to the first account. The asset units of the first digital asset are spent from the first account. The asset units of the first digital asset are retired.

25 Claims, 9 Drawing Sheets

(56) References Cited

U.S. PATENT DOCUMENTS

2016/0292672 A1\* 10/2016 Fay ........................ G06Q 20/36
2016/0330034 A1\* 11/2016 Back ...................... G06Q 20/06
2017/0005804 A1\* 1/2017 Zinder ................... H04L 9/3247

\* cited by examiner

MULTI-ASSET BLOCKCHAIN NETWORK PLATFORM

CROSS-REFERENCE TO RELATED APPLICATIONS

The present application claims the benefit of U.S. Provisional Patent Application Ser. No. 62/320,376 filed Apr. 8, 2016 and entitled "Chain Open Standard, Chain Core and SDK," and U.S. Provisional Patent Application Ser. No. 62/411,460, filed Oct. 21, 2016 and entitled "Chain Protocol," both of which are incorporated herein by reference.

TECHNICAL FIELD

This disclosure relates to blockchain network systems, and more specifically, to a platform for creating, issuing, and controlling different types of assets on a blockchain system.

BACKGROUND

A blockchain is generally understood to be a distributed database (i.e., ledger) that can record transactions between parties efficiently and in a verifiable manner. Under conventional approaches, blockchain systems facilitate secure digital transactions. Generally, blockchain utilizes a decentralized digital ledger that records transactions into linked blocks. The ledger is immutable, and cannot be altered, which may provide security advantages over traditional systems. However, typical blockchain systems only handle transactions for a single asset type (e.g., bitcoin).

SUMMARY

A claimed solution rooted in computer technology overcomes problems specifically arising in the realm of computer technology. A multi-asset blockchain network platform is provided for creating, issuing, and controlling different types of assets on a blockchain network system. For example, several new digital assets may be defined (e.g., each associated with a different underlying asset such as a "gold" asset, an "Acme Stock" asset, an "Acme currency" asset, and/or the like). Digital assets may be user-defined and/or predetermined, and asset definitions may be stored for subsequent transactions, e.g., as opposed to being defined and/or created for a particular transaction and/or set of transactions. Digital assets may be issued to accounts (e.g., account "Alice"), spent to other accounts, and/or retired from accounts (e.g., to remove the assets from circulation) by adding transactions to the blockchain. Transactions may include single blockchain operations and/or multiple blockchain operations. For example, a particular blockchain transaction may include an issuance of 100 units of a digital asset (of a type of asset such as gold) to account George, an issuance of 20 units of asset Acme stock to account Bob, and an issuance of 30 units of Acme currency to account Bob.

In some embodiments, each node of the multi-asset blockchain platform independently validates the contents of the blockchain, and all nodes must agree on what constitutes validity in order to have a mutually consistent view of the history, and therefore the current state, of the blockchain. For example, a federated consensus protocol may be used and/or implemented to perform the validation. In some embodiments, the multi-asset blockchain network platform allows nodes to validate that a sufficient subset of a trusted set of parties have certified a given view of the history of the blockchain. For example, a federated consensus protocol may be used and/or implemented to perform the validation.

Various embodiments of the present disclosure include systems, methods, and non-transitory computer readable media configured to define a plurality of different assets, the plurality of different assets including at least a first digital asset of a first asset type and second asset of a second asset type, each of the first and second asset types including a respective asset identifier corresponding to a respective issuance program defining rules for issuing units of the respective asset on a blockchain. A plurality of accounts are created, the plurality of accounts including a first account and a second account, each of the first and second accounts comprising a respective tracking object (e.g., applications that track ownership of assets) that tracks ownership of assets on the blockchain using corresponding "control programs." Asset units of the first digital asset are issued to the first account. Asset units of the second digital asset may also be issued to the first account. The asset units of the first digital asset are "spent" from the first account to the second account (or associated with the second account or an output associated with the second account). The asset units of the second digital asset may be spent from the first account to the second account. The asset units of the first digital asset may be retired, and the asset units of the second digital asset may be retired or allowed to circulate on the blockchain network thereby allowing all or some of the asset units of the second digital asset to be spent or associated with other transactions with other accounts.

In some embodiments, the issuing asset units of the first digital asset to the first account and the issuing asset units of the second digital asset to the first account comprise the same transaction on the blockchain.

In some embodiments, the spending the asset units of the first digital asset from the first account to the second account and the spending the asset units of the second digital asset from the first account to the second account comprise the same transaction on the blockchain.

In some embodiments, the corresponding control programs are included in respective outputs of each transaction on the blockchain, the corresponding control programs defining a set of conditions for spending the respective outputs. In related embodiments, the set of conditions include a condition that the transaction be signed by one or specific cryptographic keys.

In some embodiments, each block of the blockchain comprises a hash of all of the transactions batched in that block, and a hash of a current state of the blockchain. In related embodiments, the current state of the blockchain comprises a set of the current unspent outputs of the blockchain. In related embodiments, each block of the blockchain includes a consensus program to prevent unauthorized participants from creating new blocks on the blockchain. In related embodiments, each new block in the block chain satisfies a particular consensus program specified in the header of the previous block in the blockchain prior to being added to the blockchain. In related embodiments, the consensus program comprises a federated consensus program. In some embodiments, the consensus program implements a part of a federated consensus protocol.

In some embodiments, the issuing asset units of the first digital asset to the first account comprises building an issue transaction (or, "issuance transaction") using the issuance program associated with the asset identifier of the first digital asset; signing the issue transaction; and providing the signed issue transaction to the blockchain. In some embodiments, the issuing asset units of the first digital asset to the first account comprises building an issuance transaction that satisfies the issuance program associated with the asset identifier of the first digital asset, and providing the issuance transaction to the blockchain. In related embodiments, an issuance program defines a set of conditions for issuance of the associated asset. In some embodiments, the set of conditions include a condition that the transaction be signed by one or more specific cryptographic keys.

In some embodiments, the issuing asset units of the second digital asset to the first account comprises building an issue transaction using the issuance program associated with the asset identifier of the second digital asset; signing the issue transaction; and providing the signed issue transaction to the blockchain. In some embodiments, the issuing asset units of the second digital asset to the first account comprises building an issuance transaction that satisfies the issuance program associated with the asset identifier of the second digital asset, and providing the issuance transaction to the blockchain. In related embodiments, an issuance program defines a set of conditions for issuance of the associated asset. In some embodiments, the set of conditions include a condition that the transaction be signed by one or more specific cryptographic keys.

In some embodiments, the spending the asset units of the first digital asset from the first account to the second account comprises building a spend transaction using the issuance program associated with the asset identifier of the first digital asset, the spend transaction action including an identifier of the second account; signing the spend transaction; and providing the signed spend transaction to the blockchain.

In some embodiments, the spending the asset units of the first digital asset from the first account to the second account comprises building a spend transaction using the issuance program associated with the asset identifier of the first digital asset and the control program associated with the second account, the spend transaction action including an identifier of the second account, the control program configured to control receiving the asset units of the first digital asset in the second account; signing the spend transaction; and providing the signed spend transaction to the blockchain.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Figure 1:
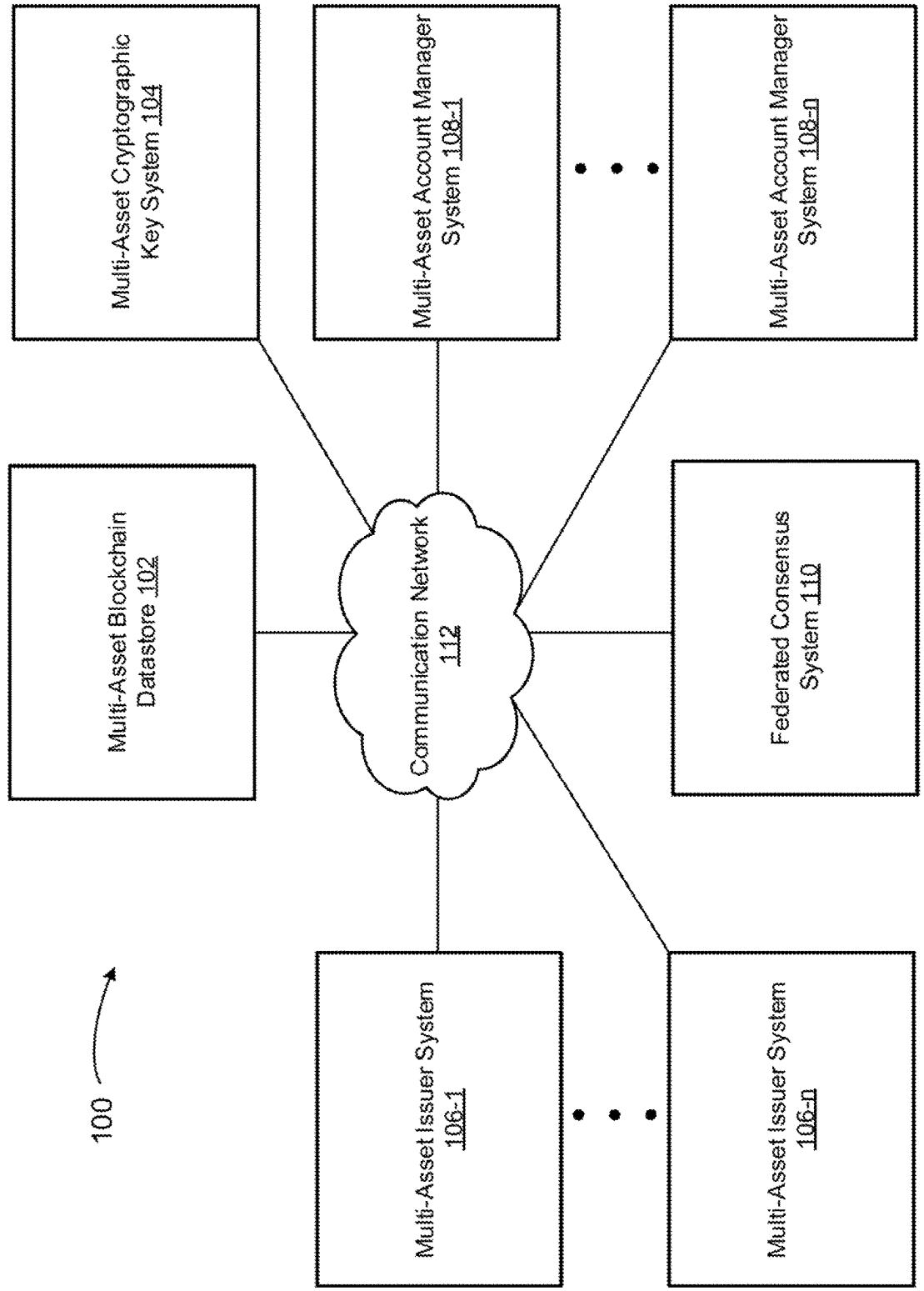
FIG. 1 depicts a diagram of an example of a multi-asset blockchain network platform according to some embodiments.

Recent innovations have made it possible to represent transferable, real-world value in digital form. One problem with digital data, however, is that digital data can be copied. Even so-called "copy-protected" data (such as movies on DVD) does not prevent copying, but rather the data is scrambled such that, when copied, the scrambled data is useless without descrambling the data (e.g., unless the device, such as a DVD player, can both descramble the data and determine that the data is an original copy).

In a blockchain network, digital data is not given as payment but rather others on a network are given a signed statement of a transaction indicating payment. Such a statement itself may be used as payment in further transactions. Unlike traditional tokens of exchange, the statement is meant to be copied and widely distributed.

In some embodiments, a blockchain is a ledger that is distributed, immutable, and cryptographically secure. "Distributed" means that interested parties may be able to, in principle, obtain and independently validate the contents of the ledger. "Immutable" means that once something is recorded on the blockchain, the recorded information does not change. "Cryptographically secure" means that the contents of the blockchain may not be changed without detection and that an asset on the blockchain can be claimed only by its rightful owner.

Validation is a central concept on a blockchain network. The sender of an asset must prove that he or she owns the asset, and that the asset has not already been spent (or associated with a transaction transferring ownership). To make this possible, each transaction in a blockchain network may contain information needed for validation: authentication, sources, amounts, and business logic. The transaction may include a set of outputs, which are destinations for the assets. In one simple example, each output may be secured with the recipient's public key, which is known to all parties.

Each transaction may also have a set of inputs (e.g., the sources of the assets being transferred). These inputs may redeem the outputs of earlier transactions. An input may supply a digital signature matching the previous output's public key. The digital signature may be made from a combination of the private key, known only to the sender, and the details of the proposed new transaction. Every participant (e.g., issuer systems, account manager systems, observer systems, and/or the like) on the network may be able to independently validate the proposed transfer, whereupon each participant may add it to its copy of the blockchain. In this example, an entity's balance at any given time is simply the sum of all unspent transaction outputs secured with one's public key.

If someone tries to transfer funds they do not own, the transaction will be invalid because the digital signature in the input will not match the public key in the previous output. If someone rewrites the transaction on its way to the blockchain in an attempt to send its funds to a new destination, the transaction will be invalid because the digital signature in the input will no longer match the details of the proposed new transaction. If someone tries to submit two transactions both redeeming the same old output (i.e., double-spending), the second transaction will be invalid because the first transaction can be seen on the blockchain. If the inputs and the outputs of a transaction do not balance, the transaction will be invalid. By design, every party can agree on the validity of every transaction.

In traditional systems, when one party intends to move assets from place to place, a database must mirror that movement. The database representation might not faithfully record the details of the transfer (due to human error, data corruption, etc.) and so a separate reconciliation step must ensure all recordkeeping systems are internally consistent. Furthermore, the database representation will precede or follow the movement of the actual funds by some amount of time, so there is the need for a separate settlement step to ensure that the recordkeeping matches the reality.

A blockchain may eliminate these steps. In various embodiments, participants on a blockchain network can transact with confidence. Once a transaction is included in a blockchain, the submitter has confidence that the transaction is final, valid, and settled.

The blockchain permits some interesting other features not possible in traditional database schemes. For instance, in some embodiments, because transactions on a blockchain can have multiple inputs and outputs, it is possible to perform atomic swaps of assets: payment and delivery in the same transaction, eliminating counterparty risk. Also, a generalization of the public-key/digital-signature mechanism for securing and redeeming funds permits the creation of smart contracts. With a smart contract, the sender of some funds may not specify a recipient's public key in the transaction output; instead, they specify (via a compact scripting language) the terms under which those funds may be redeemed. Whoever is first to satisfy those terms may access the funds. The terms may include identifying authorized payees, requiring transfer of some other asset as payment, locking up the funds until a specific time, or some combination of these and many other possible conditions. As before, every party on the network may verify whether a new transaction proposing to redeem the funds in a smart contract is valid according to the contract's terms. Invalid transactions are simply excluded from the blockchain.

Because of the blockchain's design, an unspent transaction output may have the same properties as a real cash bearer instrument: it can only be spent once by its owner, its face value cannot be mistaken, it cannot be forged or duplicated, and once spent it can be spent again immediately, but only by the new owner.

A claimed solution rooted in computer technology overcomes problems specifically arising in the realm of computer technology. A multi-asset blockchain network platform is provided for creating, issuing, and controlling different types of assets on a blockchain network system. For example, several new assets may be defined (e.g., a "gold" asset, an "Acme Stock" asset, an "Acme currency" asset, and/or the like). Assets may be user-defined and/or predetermined, and asset definitions may be stored for subsequent transactions (e.g., as opposed to being defined and/or created for a particular transaction and/or set of transactions).

Assets may be issued to accounts (e.g., account "Alice"), associated with transactions (e.g., outputs), spent to other accounts, and/or retired from accounts by adding transactions to the blockchain. Transactions may include single blockchain operations and/or multiple blockchain operations. For example, a particular blockchain transaction may include an issuance of 100 units of a digital asset associated with an underlying asset (e.g., gold) to account George, an issuance of 20 units of a digital asset associated with another underlying asset (e.g., Acme stock) to account Bob, and an issuance of 30 units of another digital asset associated with a different underlying asset (e.g., Acme currency) to account Bob.

In some embodiments, a blockchain, also known as a distributed ledger, is a type of immutable distribute database whose records operate like transferable instruments. Unlike a traditional database, where one entity is responsible for updating records for all participants, a blockchain gives direct control of digital assets to the participants themselves. Each participant maintains a set of private keys that secures their digital assets on a blockchain. When they wish to transfer digital assets to another participant, they create a ledger update, known as a transaction, and sign it with their private keys. Once the signed transaction is submitted to the blockchain, the ownership of the digital assets is immediately and irreversibly updated for both participants. The initial issuance of digital assets onto a blockchain is also controlled by cryptographically signed transactions. Each issuer maintains a set of private keys required to issue a specific type of digital asset. Whether the participants on a blockchain are individuals, companies, or systems, and whether asset transfers span countries, companies, or even divisions within a single company, a blockchain offers a secure, trustless way to issue, manage and transfer assets.

In some embodiments, each node of a multi-asset blockchain network platform independently validates the contents of the blockchain, and all nodes must agree on what constitutes validity in order to have a mutually consistent view of the history, and therefore the current state, of the blockchain. In some embodiments, the multi-asset blockchain network platform allows nodes to validate that a sufficient subset of a trusted set of parties have certified a given view of the history of the blockchain.

FIG. 1 depicts a diagram of an example of a multi-asset blockchain network platform 100 according to some embodiments. The example platform 100 shown in FIG. 1 includes multi-asset blockchain datastore 102, multi-asset cryptographic key system 104, multi-asset issuer systems 106-1 to 106-*n* (individually, the multi-asset issuer system 106, collectively, the multi-asset issuer systems 106), multi-asset account manager systems 108-1 to 108-*n* (individually, the multi-asset account manager system 108, collectively, the multi-asset account manager systems 108), a federated consensus system 110, and a communication network 112.

The multi-asset blockchain datastore 102 may function to maintain one or more structures of immutable sets of cryptographically linked transactions involving any number of digital assets and/or sets of digital assets. The multi-asset blockchain datastore 102 may batch transactions into immutable blocks that are linked with pointers to form a chain. The functionality of the multi-asset blockchain datastore 102 may be performed by one or more servers, workstations, desktop computers, laptop computers, mobile devices (e.g., smartphone or tablet computer), and/or other computing devices. The multi-asset blockchain datastore 102 may be distributed and/or decentralized.

In some embodiments, digital assets may include any underlying (e.g., "real world") asset and may represent any unit of value. Digital assets may be of any asset type (e.g., government currencies, corporate bonds, loyalty points, IOUs, internal deposits, and the like), and may predefined and/or user defined. An asset type is or represents a group of assets that are categorized based on similar characteristics (further examples include Euros, real property, stock, bonds, options, exchange traded funds, or the like).

In some embodiments, each type of asset has an asset type identifier (or, "asset type ID") which may be associated with an asset type of an underlying asset. For example, an asset type ID may comprise a 256-bit string designed to be globally unique within one blockchain, and/or across multiple blockchain (e.g., formed by a plurality of connected multi-asset blockchain network platforms 100). Each asset type ID may correspond to an issuance program, which may define the rules for issuing units of that asset. In some embodiments, the asset type ID may be determined by computing the cryptographic hash of the issuance program. In some embodiments, the determination of the asset type ID may also include an identifier for the blockchain on which it is meant to be issued. Once units have been issued, the rules for spending them are determined by control programs.

In some embodiments, a digital asset may be or represent a type of value that can be issued on a blockchain. All units of a given asset may be fungible. Units of an asset can be transacted or encumbered (e.g., associated with transactions) directly between parties without the involvement of the issuer. Each digital asset may have a globally unique asset ID that is derived from an issuance program. The issuance program typically defines a set of possible signing keys and a threshold number of signatures that must be provided to authorize issuance of new units of the digital asset. The multi-asset blockchain network platform 100 may create the issuance program when the digital asset is created. In some embodiments, the issuer can issue as many units as they want, as many times as they want. Custom issuance programs are possible that enforce further limits on when, whether, and by whom new units may be issued. Each asset can optionally include reference data consisting of arbitrary key-value data. The reference data may be committed to the blockchain for all participants to see. Additionally, an asset can be tagged locally with private data for convenient queries and operations.

The multi-asset cryptographic key system 104 may function to generate, store, and manage cryptographic keys. Cryptographic private keys may be a primary authorization mechanism on a blockchain. For example, cryptographic keys may control both the issuance and transfer of assets. In some embodiments, each transaction is signed using specific private keys required for the issuance or transfer (e.g., association with a transaction and/or output) it proposes, and the signature may be checked against corresponding public keys recorded in an earlier transaction, or the asset type being issued, in order to determine the new transaction's validity. In some cases, a digital asset or an account will define a single key required for issuance or for transfers. In other cases, multiple keys may be defined for different usage patterns or to achieve different levels of security. For example, a high-value asset may be defined with two signing keys, requiring two separate parties to sign each issuance transaction. A joint account may also be defined with two signing keys, requiring only one, from either party, to sign each transfer. As used herein, the threshold number of signatures required may be referred to as a quorum.

In some embodiments, private keys are generated within an HSM (hardware security module) and never leave the HSM. The corresponding public keys may be exploited for use within the multi-platform blockchain system 100. In order to issue or transfer asset units on a blockchain, a transaction may be created in the multi-platform blockchain system 100 and sent to the HSM for signing. The HSM may sign the transaction without ever revealing the private key. Once signed, the transaction can be submitted to the blockchain.

The multi-asset issuer systems 106 may function to define new asset objects, issue units of the digital assets, and/or track the amount of digital assets and types of digital assets in circulation. The multi-asset issuer systems 106 can issue directly to any account in the multi-platform blockchain system 100, or to a script on the blockchain. For example, that script may correspond to an account on any multi-platform blockchain system 100. In some embodiments, some or all asset definitions may be committed to the blockchain, so it may be verified later. In other embodiments, some or all asset definition are not committed to the blockchain.

The functionality of the multi-asset issuer systems 106 may be performed by one or more servers, workstations, desktop computers, laptop computers, mobile devices (e.g., smartphone or tablet computer), and/or other computing devices. The multi-asset issuer systems 106 may be distributed and/or decentralized. The multi-asset issuer systems 106 may implemented to the computing device(s) as other systems of the multi-platform blockchain platform 100.

The multi-asset account manager systems 108 may function to create accounts, hold digital assets, receive (or associate) digital assets into/with accounts, transfer (or associate) digital assets to arbitrary destinations, retire digital assets permanently and/or otherwise control digital assets after issuance. The functionality of the multi-asset account manager systems 108 may be performed by one or more servers, workstations, desktop computers, laptop computers, mobile devices (e.g., smartphone or tablet computer), and/or other computing devices. The multi-asset account manager systems 108 may be distributed and/or decentralized. The multi-asset account manager systems 108 may implemented to the computing device(s) as other systems of the multi-platform blockchain platform 100.

In some embodiments, the consensus system 110 may function to sign and/or generate blocks of a blockchain according to a consensus. In various embodiments, each node (e.g., digital device) in a blockchain network independently validates contents of the blockchain, and all nodes agree on what constitutes validity in order to have a mutually consistent view of the history, and therefore the current state, of the system. For this purpose, blockchain systems may use a consensus program by which the blockchain network reaches agreement on which block (of possibly many candidates) should be added to the blockchain at each step. In some embodiments, the consensus system 110 may implement federated consensus.

In federated consensus, there is one designated block generator (called "miners" in some blockchain systems) and so there are not multiple possible candidates to choose from. The block generator proposes a new block. A designated set of block signers ratify and digitally sign the proposed block. All network members know the identities of the block signers and accept blocks only if signed by sufficiently many of them. The threshold number of signatures required can be adjusted based on the particular circumstances of the network. In some embodiments, the required threshold for accepting a block is two-thirds of the total number of block signers. In other embodiments, the required threshold for accepting a block is a simple majority of block signers. In other embodiments, the required threshold for accepting a block is unanimous agreement of all block signers.

Federated consensus is similar to the steady-state mode of a consensus algorithm called PBFT (for Practical Byzantine Fault Tolerance). However, rather than deposing the block generator in case of failure, federated consensus has fail-stop behavior.

Federated consensus may protect against malicious block proposals, and all types of failures in signers, as long as the generator continues producing good values as well. The generator cannot censor transactions without the transacting network members noticing; nor can it "fork" the blockchain, providing a different history to different subsets of the network, as long as a sufficient number (e.g., simple majority) of the signers remain honest. The only scenario federated consensus may not handle is the total loss of the generator, but in a robust implementation in which the generator itself is run as a distributed process within a single organization's trust boundary, this should be exceedingly rare and would require organization-level intervention in any event. The system may also be designed so that the block signers can select a new block generator without requiring approval of or participation by other nodes in the network. This tradeoff may mean federated consensus permits a greatly simplified and more scalable network architecture compared to PBFT.

In some embodiments, the consensus system 110 may function to sign and/or generate blocks of a blockchain according to a federated consensus protocol based on approval from a federation of block signers (e.g., the block signers being a subset of possible users or digital devices associated with the communication network 112. Federated consensus is a mechanism ensuring that only one valid blockchain is published and therefore double-spends (i.e., contrasting transactions for the same digital asset) are prevented. In some embodiments, a federation consists of a single block generator and a group of block signers. The block generator may receive transactions from the network, filters out transactions that are invalid, filter out transactions that do not pass local policy checks, periodically aggregate the remaining transactions in a new block; and sends each proposed block to the block signers for approval. Each block signer may verify that the proposed block is signed by the generator, verify that it follows the protocol rules (excluding checks for block signers' signatures, which are not yet present), verify that it extends their chain (i.e. the block does not fork the chain), verify that the block contains an acceptable consensus program (for authenticating the next block), and sign the block.

In some embodiments, once the block generator receives signatures from enough block signers (e.g., as defined by the block's consensus program), the block generator may publish the block to the network. All network nodes may validate that block on receiving it (e.g., including block signers' signatures). Meanwhile the block generator assembles the next block with more transactions. It will be appreciated that there may be any number of block generators and/or a consensus or predetermined number of signers of the block generators may be required before a block is generated.

Each block may be authenticated to the network via a consensus program declared in the previous block. In some embodiments, the consensus program is a predicate that must be satisfied by program arguments in the subsequent block. In one example, a consensus programs implements an "M-of-N multisignature" rule where M is the number of required signature and N is the number of block signers. Public keys are included within the program and the signatures are provided in the arguments list. The program checks that the signatures are correctly made from the subsequent block and match the keys in the consensus program. New blocks may reuse the same consensus program or change it to a new consensus program (as when members join and leave the federation) as long as a quorum of block signers approve the change.

In some embodiments, a signature supplied by a block generator to authenticate a block-signing request to the block signers may be distinct from the block-ratifying signature that the signers themselves supply. In some embodiments, only the latter are part of the rules used by the rest of the network to validate blocks. This allows block signers to evolve the consensus mechanism without any additional support from the rest of the network.

In some embodiments, a federated consensus protocol (or, program) specifies a set of N public keys and uses the CHECKMULTISIG and BLOCKSIGHASH instructions to confirm that the block witness includes M valid signatures on the block hash (where M and N are parameters of the algorithm). Each public key may correspond to a block signer. In various embodiments, block signers do not sign two different blocks with the same height. As long as no more than $2M-N-1$ block signers violate this rule, the blockchain is not forked (which is the primary responsibility of the block signers of the federated consensus group). Because of this rule, block signers must coordinate to make sure they sign the same block. To ensure this, in some embodiments, they may rely on a single block generator.

The block generator collects transactions, periodically batching transactions together into blocks. The generator sends each proposed new block to the block signers. Block signers sign blocks that have already been signed by the generator. While the block generator is not capable of forking the blockchain, it does have a privileged role. In one example, the block generator may have control over network liveness: if the block generator crashes or otherwise stops producing new blocks, the blockchain halts. The block generator can also deadlock the network by sending inconsistent blocks to different block signers. Additionally, the block generator may have control over the block timestamp, and can produce blocks with artificially "slow" timestamps.

The communication network 112 may represent one or more computer networks (e.g., LAN, WAN, and/or the like) or other transmission mediums. The communication network 112 may provide communication between the multi-asset blockchain datastore 102, the multi-asset cryptographic key system 104, the multi-asset issuer systems 106, the multi-asset account manager systems 108, the federated consensus system 110, and/or other systems and/or or components thereof described herein. In some embodiments, the communication network 112 comprises one or more computing devices, routers, cables, buses, and/or other network topologies (e.g., mesh, hub-and-spoke, and/or the like). In some embodiments, the communication network 112 may be wired and/or wireless. In various embodiments, the communication network 112 may comprise the Internet, one or more wide area networks (WANs) or local area networks (LANs), one or more networks that may be public, private, IP-based, non-IP based, and so forth.

The multi-asset cryptographic key system 104, multi-asset issuer systems 106-1 to 106-n (individually, the multi-asset issuer system 106, collectively, the multi-asset issuer systems 106), multi-asset account manager systems 108-1 to 108-n (individually, the multi-asset account manager system 108, collectively, the multi-asset account manager systems 108), and the federated consensus system 110, may operate or function as software, firmware or both. Each or any number of the multi-asset cryptographic key system 104, multi-asset issuer systems 106-1 to 106-n (individually, the multi-asset issuer system 106, collectively, the multi-asset issuer systems 106), multi-asset account manager systems 108-1 to 108-n (individually, the multi-asset account manager system 108, collectively, the multi-asset account manager systems 108), and the federated consensus system 110 may be controlled or may configure any number of processors.

In one example, as discussed herein, each multi-asset issuer system 106-1 through n may include software on a different digital device that communicates over the communication network 112. The multi-asset blockchain datastore 102 may be any datastructure (e.g., database, table, or the like) or combination of data structures where data may be stored and/or retrieved over the communication network 112. The multi-asset cryptographic key system 104 may include software on a digital device that communicates over the communication network 112. In some embodiments, cryptographic keys are stored in the multi-asset blockchain datastore 102. In some embodiments, as discussed herein, each multi-asset account manager 108-1 through n may include software on a different digital device that communicates over the communication network 112. The federated consensus system 110 may include any number of digital devices for signing the blocks of the blockchain network or control rules for signing the blocks. In various embodiments, the block signors identified by the federated consensus system 110 and/or the block generator may include separate software on different digital devices in communication with the communication network 112.

In some embodiments, parts of blockchain validation involve sets of conditions that can be specified by the user and/or automatically, such as issuance programs, consensus programs, and control programs. For example, the sets of conditions may be expressed as bytecode programs for the same virtual machine (e.g., virtual stack machine). In some embodiments, each node validating the blockchain executes a virtual machine that interprets such programs. In some embodiments, these programs may depend on arguments, such as digital signatures on blocks or transactions. In related embodiments, these arguments can be provided as arguments to the virtual machine (e.g. pushed onto the stack of a virtual stack machine) before the corresponding program is executed.

Figure 2:
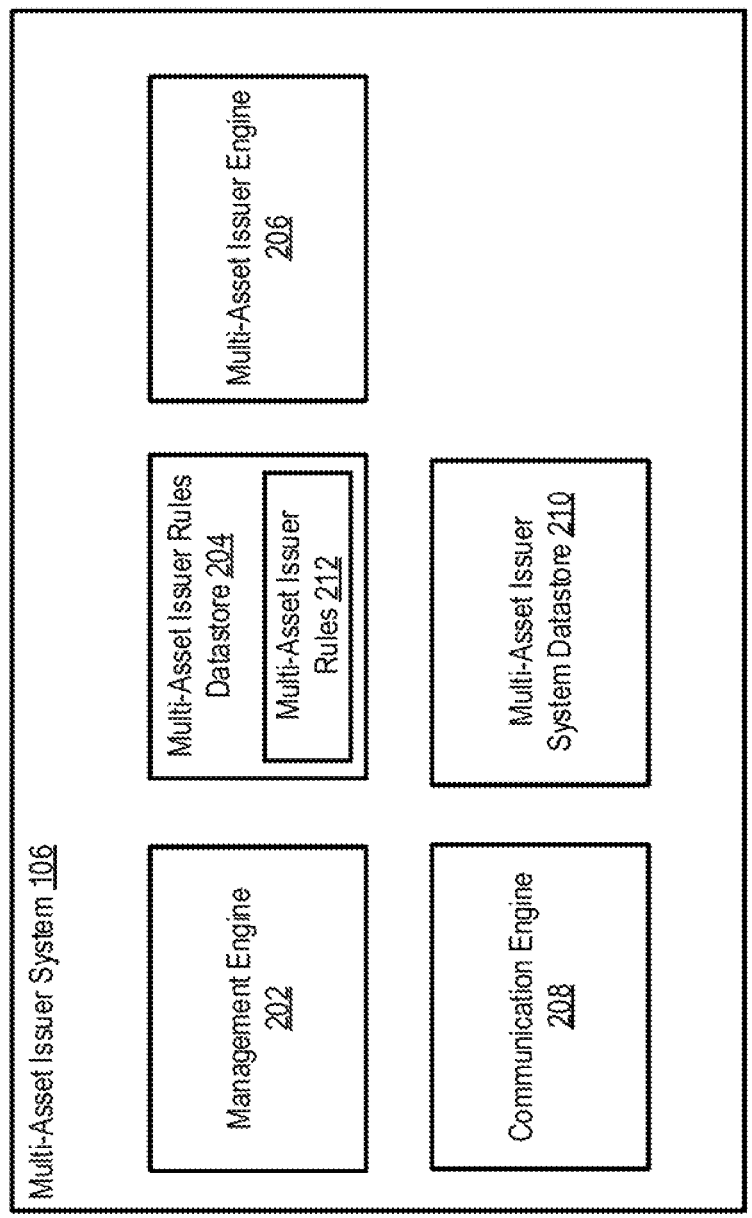
FIG. 2 depicts a diagram of an example of a multi-asset issuer system according to some embodiments.

FIG. 2 depicts a diagram 200 of an example of a multi-asset issuer system 106 according to some embodiments. The multi-asset issuer system 106 includes a management engine 202, a multi-asset rules datastore 204, a multi-asset issuance engine 206, a communication engine 208, and a multi-asset issuer system datastore 210. In some embodiments, the management engine 202, a multi-asset issuance engine 206, and communication engine 208 may be software that interacts with (e.g., controls or configures) any number of processors to function as discussed herein. In various embodiments, the management engine 202, a multi-asset issuance engine 206, and communication engine 208 may include software, hardware, or both. The multi-asset issuer rules datastore 204 and the multi-asset issuer system datastore 210 may include any number of data structures.

The management engine 202 may function to manage (e.g., create, read, update, delete, or otherwise access) multi-asset issuer rules 212 stored in the multi-asset issuer rules datastore 204. The management engine 202 may perform any of these operations manually (e.g., by a user interacting with a GUI) and/or automatically (e.g., triggered by one or more of the engines 204-206, discussed below). In some embodiments, the management engine 202 comprises a library of executable instructions, which are executable by one or more processors for performing any of the aforementioned management operations.

The multi-asset rules datastore 204 may function to store multi-asset issuer rules 212 for defining blockchain operations performed by the multi-asset issuer system 106. The multi-asset issuer rules 212 may be implemented in one or more issuance programs. For example, a user may implement a multi-asset issuer rules 212 with particular condition definitions and/or attribute values. The multi-asset issuer rules 212 may define operations for creating (or, "defining") digital assets of different types, and/or issuing units of digital assets. The defined operations for creating the digital asset is an asset object.

The multi-asset issuer rules 212 may include conditions which may apply to blockchain actions. For example, the conditions may include the number of units that may be issued for a particular digital asset, the number of accounts that may receive or be associated a particular digital asset, expiration dates of a digital asset, number of keys (e.g., quorum) required to sign a transaction for a digital asset, and/or the like. The conditions may be or may not be a part of the asset object.

The multi-asset issuance engine 206 may function to create digital assets (e.g., using multi-asset issuer rules 212). Generally, a single multi-asset blockchain can support multiple types of assets. Each type of asset may have an asset type identifier, (or, "asset type ID"). An asset type ID may be a 256-bit string designed to be globally unique within one or more blockchains. Each Asset type ID may correspond to an issuance program, which may define the rules for issuing units of that digital asset.

In some embodiments, the multi-asset issuance engine 206 may generate a digital asset or a digital object for issuing or creating digital assets. A digital asset may include some or all of the following attributes, types, and/or visibility, which may be defined in the multi-asset issuer rules 212:

ID: Globally unique identifier of the asset. String type. Global visibility.

Alias: user-supplied, locally unique identifier of the asset.

Issuance Program: The program defining the keys and quorum of signatures required to issue units of the asset.

Quorum: The number of keys from signatures are to required issue units of the asset.

Reference data: Arbitrary, user-supplied key-value data about the asset. JSON object, global visibility.

Tags: Arbitrary, user-supplied, key-value data about the asset.

Keys: a list of keys used to generated the associated issuance program. Array type. Global and/or local visibility.

In some embodiments, attributes with global visibility exist as part of the immutable record on the blockchain, and attributes with local visibility may be private annotations that are not a part of the blockchain record.

The multi-asset issuance engine 206 may function to issue digital assets (e.g., using multi-asset issuer rules 212, and/or issuance programs implementing multi-asset issuer rules 212). For example, the multi-asset issuance engine 206 may issue multiple different types of assets to one or more accounts within one or more transactions. Issuance programs, asset issuances, and asset creation are also described elsewhere herein.

The communication engine 208 may function to send requests, transmit and, receive communications, and/or otherwise provide communication with one or a plurality of systems. In some embodiments, the communication engine 208 functions to encrypt and decrypt communications. The communication engine 208 may function to send requests to and receive data from a system through a network or a portion of a network. Depending upon implementation-specific or other considerations, the communication engine 208 may send requests and receive data through a connection, all or a portion of which may be a wireless connection. The communication engine 208 may request and receive messages, and/or other communications from associated systems.

The multi-asset issuer system datastore 210 may function to store, at least temporarily, data received from one or more other systems. For example, the multi-asset issuer system datastore 210 may store messages received by the communication engine 208. Like other datastores described herein, the multi-asset issuer system datastore 210 may reside locally, or comprise a remote storage system (e.g., a cloud storage system).

Figure 3:
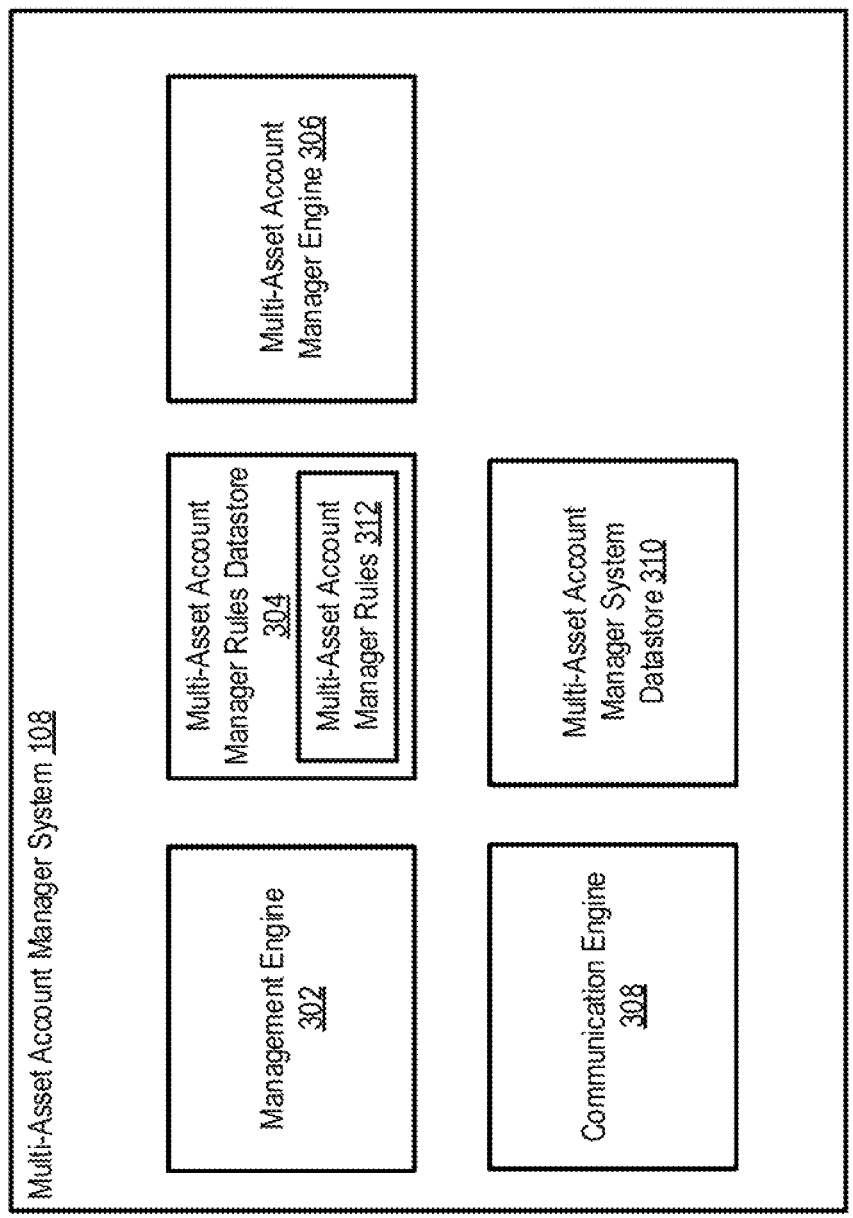
FIG. 3 depicts a diagram of an example of a multi-asset account manager system according to some embodiments.

FIG. 3 depicts a diagram 300 of an example of a multi-asset account manager system 108 according to some embodiments. The multi-asset account manager system 108 includes a management engine 302, a multi-asset account manager rules datastore 304, a multi-asset control engine 306, a communication engine 308, and a multi-asset control system datastore 310. In some embodiments, the management engine 302, a multi-asset control engine 306, and communication engine 308 may be software that interacts with (e.g., controls or configures) any number of processors to function as discussed herein. In various embodiments, the management engine 302, a multi-asset control engine 306, and communication engine 308 may include software, hardware, or both. The multi-asset account manager rules datastore 304 and the multi-asset account manager system datastore 310 may include any number of data structures.

The management engine 302 may function to manage (e.g., create, read, update, delete, or otherwise access) multi-asset account manager rules 312 stored in the multi-asset account manager rule datastore 310. The management engine 302 may perform any of these operations manually (e.g., by a user interacting with a GUI) and/or automatically (e.g., triggered by one or more of the engines 306-308, discussed below). In some embodiments, the management engine 302 comprises a library of executable instructions, which are executable by one or more processors for performing any of the aforementioned management operations. The instructions may be maintained on a non-transitive computer readable medium.

The multi-asset rules datastore 304 may function to store multi-asset account manager rules 312 for defining blockchain operations performed by the multi-asset account manager system 108. The multi-asset issuer rules 312 may be implemented in control programs. Control programs may include account control programs, among others, some or all of which may be defined by the multi-asset account manager rules 312. Account control programs may define a set of keys (e.g., encryption keys) and a number of signatures required to spend asset units (e.g., a quorum, majority, or all signers of a group). For example, when creating an account, a set of root keys and a quorum may be provided. Each time assets are deposit into an account, the system derives a new set of child public keys from the account root keys and creates a unique, one-time-use account control program requiring the quorum of signatures you specified. Although all control programs in one account are controlled by keys derived from the same root keys, it is impossible for other participants on the blockchain to recognize any relationship between them. In some embodiments, this technique may help ensure that only the participant on the blockchain with whom you transact will know that a specific control program is yours. In this embodiment, to everyone else, the creator of the control program may be unknown.

The multi-asset account manager engine 306 may function to generate accounts, receive digital assets into accounts (or associate digital assets with accounts or transactions), transfer assets to arbitrary destinations, retire assets, and/or generate control programs and/or execute control programs to perform such functionality. In some embodiments, an account is an account object that tracks ownership of assets on a blockchain by creating and tracking control programs.

In some embodiments, a control program may appear in each output of each transaction, defining a set of conditions that are to be satisfied in order to spend the output—typically, that the spending transaction be signed by one or more specific keys. When an account is created, one or more "root" keys are provided and a quorum. Each separate deposit to the account (e.g., each transaction output transferring assets or associating assets with a user) uses a new control program generated by the account. Each control program is unique, using newly derived child keys of the account's root keys.

An account balance is the sum of all assets in the set of unspent transaction outputs using any of a user's derived-key control programs. When you build an asset-transfer transaction, the account may locate a sufficient quantity of "unspent" (or unencumbered) outputs associated with the account to be used as inputs to a new transaction.

In various embodiments, the account object does not exist on the blockchain. In one example, only the control programs created in the account may be visible on the blockchain. However, when a new transactions is processed, it may be annotated with local account data (e.g., facilitate queries).

The communication engine 308 may function to send requests, transmit and, receive communications, and/or otherwise provide communication with one or a plurality of systems. In some embodiments, the communication engine 308 functions to encrypt and decrypt communications. The communication engine 308 may function to send requests to and receive data from a system through a network or a portion of a network. Depending upon implementation-specific or other considerations, the communication engine 308 may send requests and receive data through a connection, all or a portion of which may be a wireless connection. The communication engine 308 may request and receive messages, and/or other communications from associated systems.

The multi-asset account manager system datastore 310 may function to store, at least temporarily, data received from one or more other systems. For example, the multi-asset account manager system datastore 310 may store messages received by the communication engine 308. Like other datastores described herein, the multi-asset account manager system datastore 310 may reside locally, or comprise a remote storage system (e.g., a cloud storage system)

Figure 4:
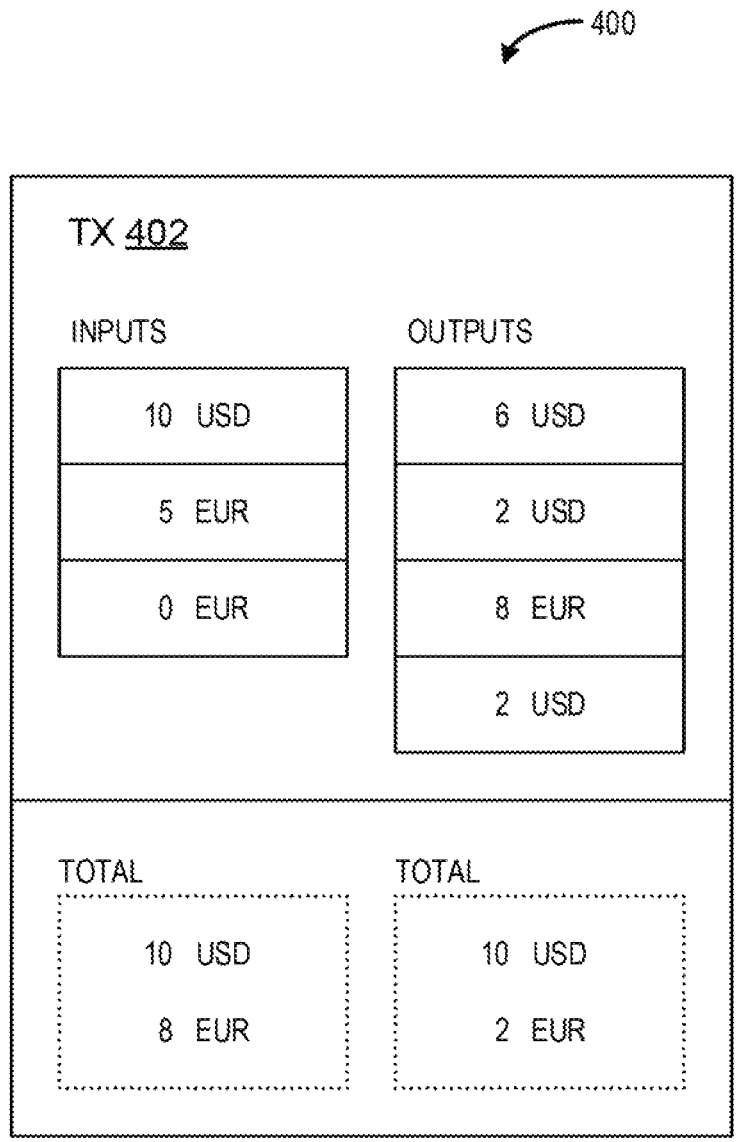
FIG. 4 depicts a diagram of an example transaction of a multi-asset blockchain network platform according to some embodiments

FIG. 4 depicts a diagram 400 of an example transaction 402 of a multi-asset blockchain network platform 100 according to some embodiments.

Generally, transactions 402 move or associate value from inputs to outputs. Each input specifies a source of value—either an issuance of new units, or an output from a previous transaction. Each output specifies a destination—namely, a control program defining the rules for spending that output in the future. Each input and output specifies a quantity of a single asset ID. A transaction 402 can mix inputs and outputs of different asset IDs, or merge or split inputs into outputs with different amounts, as long as the total values of the inputs and the total values of the outputs balance.

Figure 5:
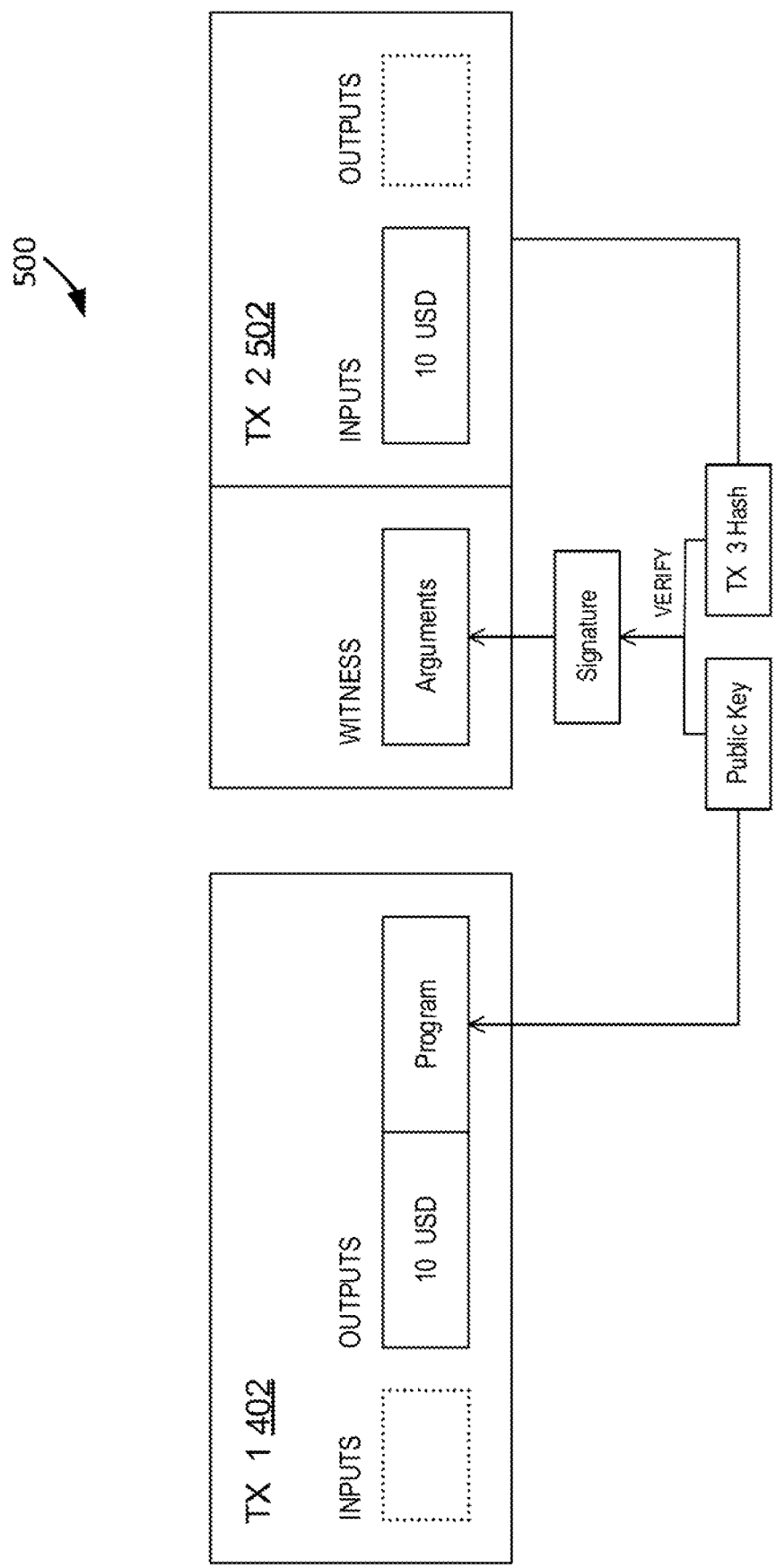
FIG. 5 depicts a diagram of example transactions of a multi-asset blockchain network platform according to some embodiments.

FIG. 5 depicts a diagram 500 of example transactions 402 and 502 of a multi-asset blockchain network platform 100 according to some embodiments.

A blockchain includes of an immutable set of cryptographically linked transactions. Each transaction contains one or more inputs, and one or more outputs. An input either issues new units of a digital asset, or transfers existing units by naming an output of an earlier transaction as the source for the transfer. Outputs take the asset units from the inputs and define how they will be allocated. A single output indicates a digital asset amount along with a control program that specifies how that amount can be spent (or associated with other outputs) in the future. Or, an output can retire units of the digital asset, removing those units from circulation on the blockchain.

A transaction can have many inputs and outputs that include of many different types of assets, many different sources, and many different destinations. In some embodiments, all actions within a transaction (issuing, spending, controlling, and retiring assets) may occur simultaneously, as a single, atomic operation. In some embodiments, there may not be a point where a transaction is only partially applied.

Within a transaction, the total amount of digital assets in the inputs may be equal to the total amount of assets in the outputs. To create new asset units, an input is issued and may be are controlled with one or more outputs. To transfer (or associate) asset units, the asset units may be "spent" or associated with an input and controlled with one or more outputs. To retire assets units, they may be associated with an input and retired in an output.

In some embodiments, any combination of inputs and outputs can be used in a single transaction, as long as what goes in is what comes out.

In some embodiments, when creating an input that spends an earlier transaction's output, the entire amount in that output must be consumed. If a user does not wish to transfer the entire amount of the output to an intended recipient, the user may make change back to the user's account. This may be analogous to cash; for example, if a user has a twenty dollar bill and desires to spent ten dollars, the user will need to get change. As a result, spending a single input often requires two outputs-one output for the intended recipient, and one output for change back to the account where the asset units came from. In general, the system may automatically manages change outputs.

Figure 6:
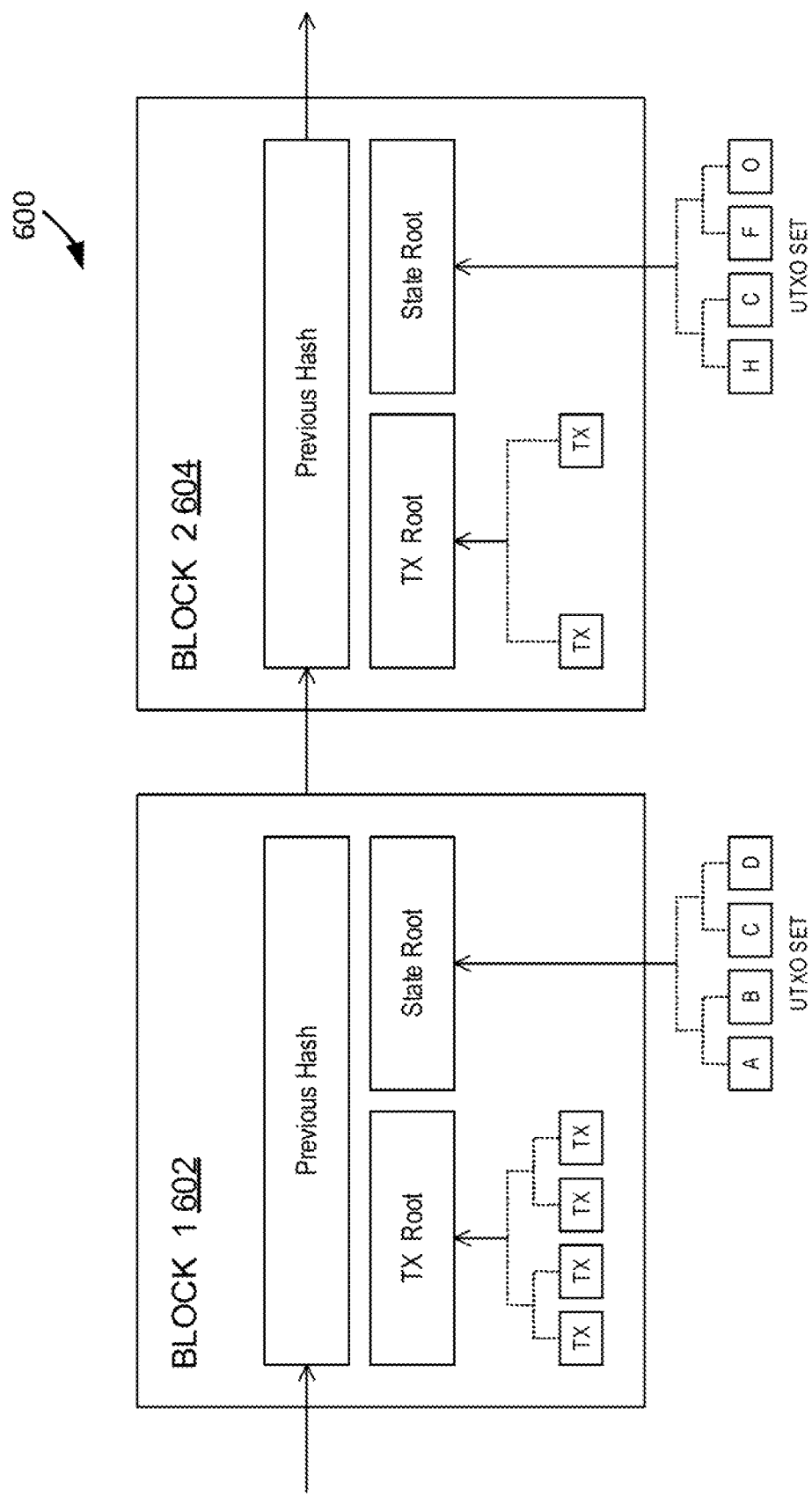
FIG. 6 depicts a diagram example blocks of an example blockchain of a multi-asset blockchain network platform according to some embodiments.

FIG. 6 depicts a diagram 600 example blocks 602 and 604 of an example blockchain of a multi-asset blockchain network platform 100 according to some embodiments.

In some embodiments, each input must satisfy an issuance program (if the source of value is a new issuance of units) or a control program (if the source of value is a previous unspent transaction output). The issuer or spender may pass arguments to the program via the witness field. For example, an issuance or control program can implement an authorization check by defining a public key and requiring a cryptographic signature over the transaction by the corresponding private key. Each transaction, and each individual input and output, may include reference data field for arbitrary application-level uses. Reference data may or may not be committed to the blockchain, and the system does not mandate any structure or semantics for its contents.

Figure 7:
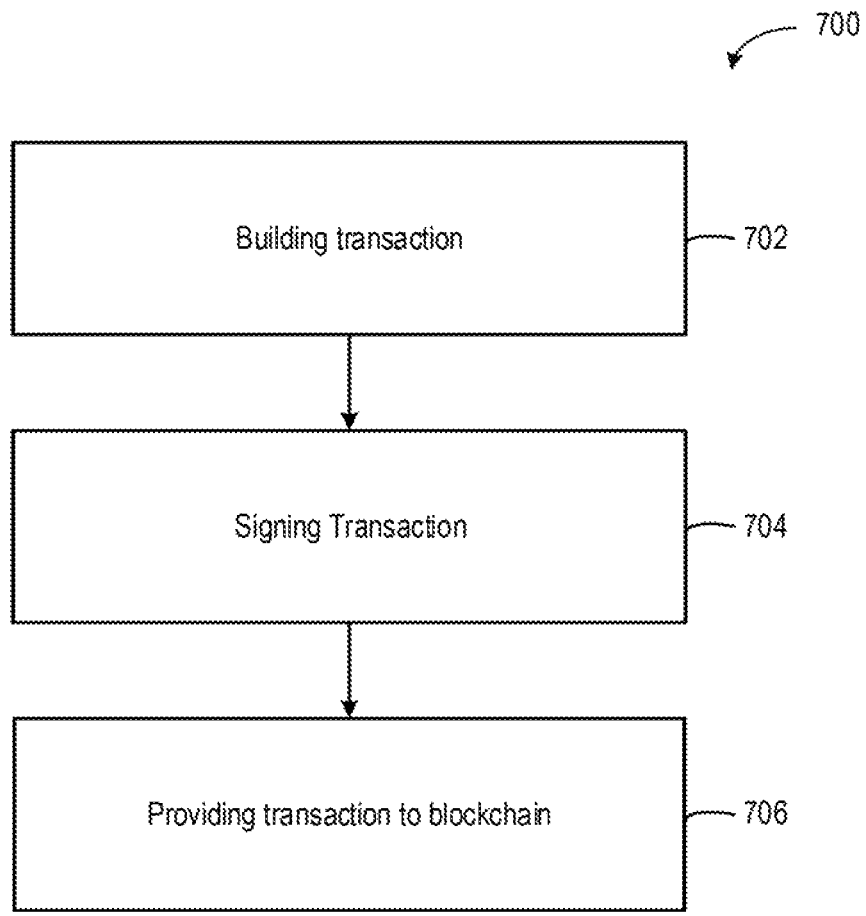
FIG. 7 depicts a flowchart of an example of a method of creating transactions on a multi-asset blockchain network platform according to some embodiments according to some embodiments.

FIG. 7 depicts a flowchart 700 of an example of a method of creating transactions on a multi-asset blockchain network platform (e.g., multi-asset blockchain network platform 100) according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 702, a computing system (e.g., multi-asset issuer system 106 and/or multi-asset account manager system 108) builds a transaction (e.g., transaction 502). For example, a multi-asset issuer engine 206 and/or multi-asset account manager engine 306 builds the transaction (e.g., based on the type of transaction). In some embodiments, the computing system can annotate transactions with arbitrary reference data, which may be committed immutably to the blockchain alongside other details of the transaction. Reference data can be specified for the entire transaction, as well as for each action. Action-level metadata may surface in the relevant inputs and outputs. For example, the sender and recipient in a simple payment may each wish to set reference data for the actions that are directly relevant to them.

In step 704, a consensus system (e.g., consensus system 110) signs the transaction. For example, one or more block signers of a federated consensus system may sign the transaction. In some embodiments, in order for a transaction to be accepted into the blockchain, its inputs must contain valid signatures. For issuance inputs, the signature may correspond to public keys named in the issuance program. For spending inputs, the signature may correspond to the public keys named in the control programs of the outputs being spent. Transaction signing provides the blockchain with its security. Strong cryptography prevents everyone, even the operators of the blockchain network, from producing valid transaction signatures without the relevant private keys.

In step 706, the consensus system provides the complete, signed transaction to the blockchain (e.g., blockchain maintained by multi-asset blockchain datastore 102). For example, a block generator of a federated consensus system provides the complete, signed transaction to the blockchain.

In some embodiments, once a transaction is balanced and all inputs are signed, it is considered valid and can be submitted to the blockchain. The system may forward the transaction to the block generator, which may add it to the blockchain. In some embodiments, the system does not return a response until either the transaction has been added to the blockchain and indexed, or there was an error.

Figure 8:
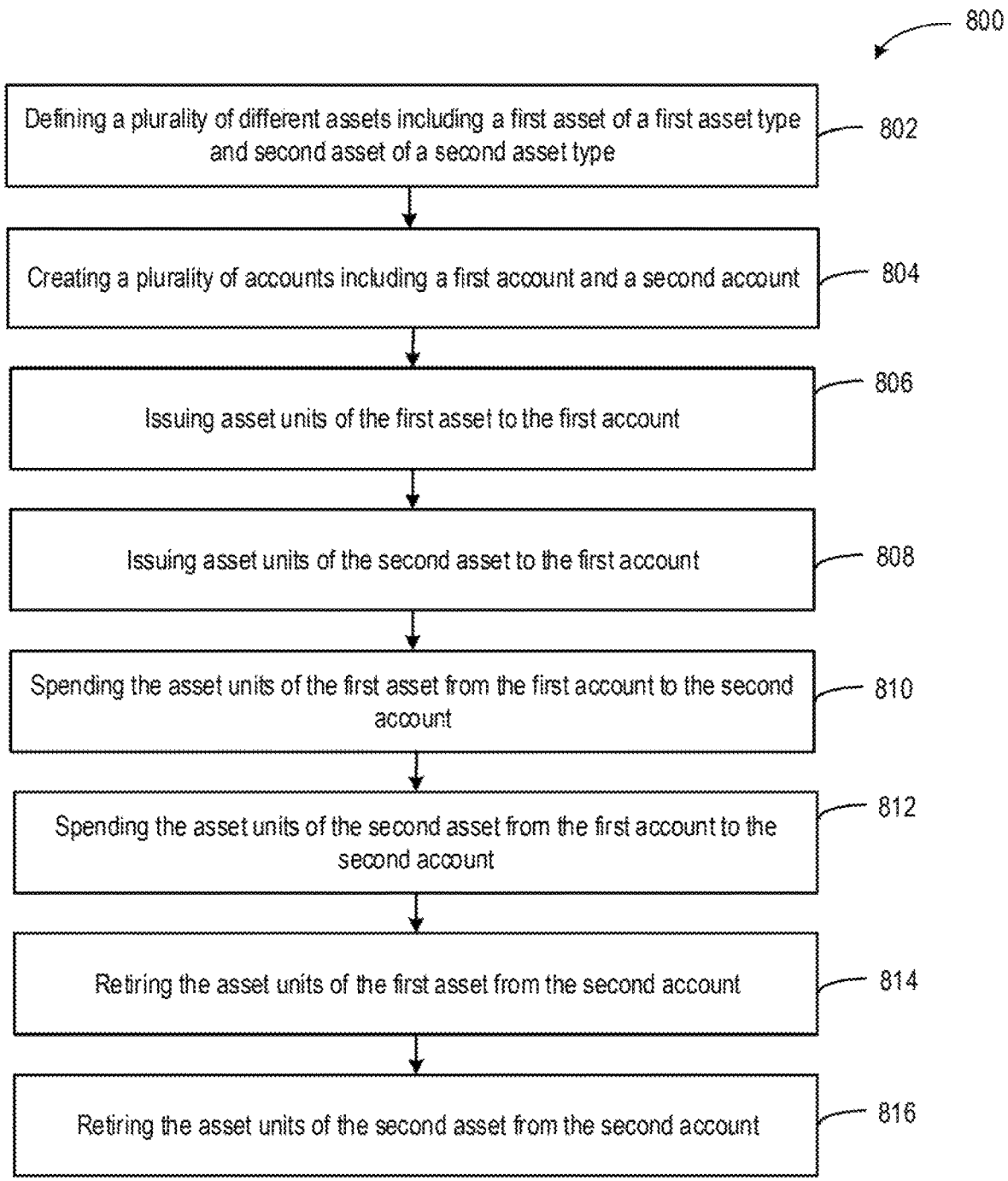
FIG. 8 depicts a flowchart of an example of a method of creating, issuing, spending, and retiring assets on a multi-asset blockchain network platform according to some embodiments.

FIG. 8 depicts a flowchart 800 of an example of a method for creating, issuing, spending, and retiring assets on a multi-asset blockchain network platform (e.g., multi-asset blockchain network platform 100) according to some embodiments.

In step 802, a multi-asset blockchain network platform (e.g., multi-asset blockchain network platform 100) defines a plurality of different digital assets, the plurality of different digital assets including at least a first digital asset of a first asset type and second digital asset of a second asset type, each of the first and second asset types including a respective asset identifier corresponding to a respective issuance program defining rules for issuing units of the respective asset on a blockchain.

In step 804, the multi-asset blockchain network platform (e.g., account manager system 108) creates a plurality of accounts, the plurality of accounts including at least a first account and a second account, each of the first and second accounts comprising a respective tracking object that tracks ownership of assets on the blockchain using corresponding control programs.

In step 806, the multi-asset blockchain network platform issues asset units of the first digital asset to the first account. In some embodiments, the multi-asset issuer system issues the asset units. For example, a multi-asset issuer engine 206 may issues the asset units. Step may 806 may comprise a particular implementation of the step 702-706 of FIG. 7.

In step 808, the multi-asset blockchain network platform issues asset units of the second digital asset to the first account. In some embodiments, the multi-asset issuer system issues the asset units. For example, the multi-asset issuer engine may issue the asset units. Step may 808 may comprise a particular implementation of the step 702-706 of FIG. 7.

In step 810, the multi-asset blockchain network platform spends (or associates) the asset units of the first digital asset from the first account to the second account. In some embodiments, the multi-asset issuer system spends the asset units. For example, a multi-asset issuer engine 206 may spend the asset units. Step may 810 may comprise a particular implementation of the step 702-706 of FIG. 7.

In step 812, the multi-asset blockchain network platform spends the asset units of the second digital asset from the first account to the second account. In some embodiments, the multi-asset issuer system spends the asset units. For example, the multi-asset issuer engine may spend the asset units. Step may 812 may comprise a particular implementation of the step 702-706 of FIG. 7.

In step 814, the multi-asset blockchain network platform retires the asset units of the first digital asset from the second account. In some embodiments, the multi-asset account manager system retires the asset units. For example, a multi-asset account manager engine 306 may retire the asset units. Step may 814 may comprise a particular implementation of the step 702-706 of FIG. 7.

In step 816, the multi-asset blockchain network platform retires the asset units of the second asset from the second account. In some embodiments, the multi-asset account manager system retires the asset units. For example, the multi-asset account manager engine may retire the asset units. Step may 816 may comprise a particular implementation of the step 702-706 of FIG. 7.

In various embodiments, some or all of the steps 802-816 may be include in a single transaction (or, "atomic transaction") and/or multiple transactions.

Figure 9:
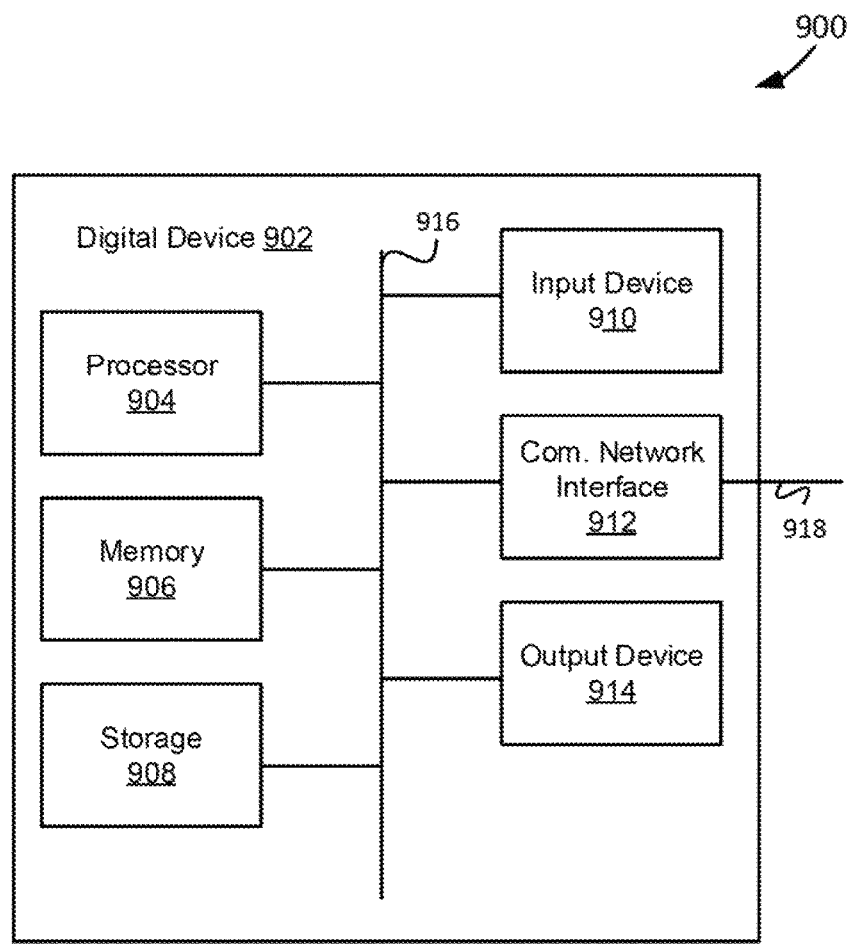
FIG. 9 depicts a diagram of an example of a computer system which may be specifically configured to implement any of the embodiments described herein.

FIG. 9 depicts a diagram 900 of an example of a computing device 902. Any of the multi-asset blockchain datastore 102, the multi-asset cryptographic key system 104, the multi-asset issuer systems 106, the multi-asset account manager systems 108, the federated consensus system 110, and the communication network 112 may comprise an instance of one or more computing devices 902. The computing device 902 comprises a processor 904, memory 906, storage 908, an input device 910, a communication network interface 912, and an output device 914 communicatively coupled to a communication channel 916. The processor 904 is configured to execute executable instructions (e.g., programs). In some embodiments, the processor 904 comprises circuitry or any processor capable of processing the executable instructions.

The memory 906 stores data. Some examples of memory 906 include storage devices, such as RAM, ROM, RAM cache, virtual memory, etc. In various embodiments, working data is stored within the memory 906. The data within the memory 906 may be cleared or ultimately transferred to the storage 908.

The storage 908 includes any storage configured to retrieve and store data. Some examples of the storage 908 include flash drives, hard drives, optical drives, cloud storage, and/or magnetic tape. Each of the memory system 906 and the storage system 908 comprises a computer-readable medium, which stores instructions or programs executable by processor 904.

The input device 910 is any device that inputs data (e.g., mouse and keyboard). The output device 914 outputs data (e.g., a speaker or display). It will be appreciated that the storage 908, input device 910, and output device 914 may be optional. For example, the routers/switchers may comprise the processor 904 and memory 906 as well as a device to receive and output data (e.g., the communication network interface 912 and/or the output device 914).

The communication network interface 912 may be coupled to a network (e.g., network 112) via the link 918. The communication network interface 912 may support communication over an Ethernet connection, a serial connection, a parallel connection, and/or an ATA connection. The communication network interface 912 may also support wireless communication (e.g., 802.11 a/b/g/n, WiMax, LTE, WiFi). It will be apparent that the communication network interface 912 may support many wired and wireless standards.

It will be appreciated that the hardware elements of the computing device 902 are not limited to those depicted in FIG. 9. A computing device 902 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 904 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. Datastores may include cloud storage. It will further be appreciated that the term "or," as used herein, may be construed in either an inclusive or exclusive sense. Moreover, plural instances may be provided for systems, resources, operations, or structures described herein as a single instance, and/or vice versa.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A system for processing blockchain transactions involving different types of assets, the system comprising:
one or more processors; and
memory storing instructions that, when executed by the one or more processors, cause the system to perform:
storing a plurality of different asset objects, a first asset object of the plurality of different asset objects defining at least a first digital asset of a first asset type, the first asset type being associated with a first category of first underlying assets, a second asset object of the plurality of different asset objects defining a second digital asset of a second asset type, the second asset type being associated with a second category of second underlying assets, the first category of first underlying assets being different than the second category of second underlying assets, the first asset type being associated with a first asset identifier corresponding to a first issuance program defining a first rule set for issuing units of the first digital asset on a blockchain, the first rule set including a first threshold condition on a blockchain action, the second asset type being associated with a second asset identifier corresponding to a second issuance program defining a second rule set for issuing units of the second digital asset on the blockchain, the second rule set including a second threshold condition on the blockchain action, the first issuance program being different than the second issuance program, the first rule set being different than the second rule set, the first threshold condition being different than the second threshold condition;
identifying the first issuance program based on the first asset identifier;
identifying the second issuance program based on the second asset identifier;
creating a plurality of accounts, the plurality of accounts including at least a first account, the first account comprising a tracking object that tracks asset ownership using corresponding control programs;
issuing, in accordance with the first rule set, one or more first units of the first digital asset of the first asset type to the first account, the one or more first units of the first digital asset of the first asset type being associated with one or more of the first underlying assets, wherein the one or more first units of the first digital asset of the first asset type are issued by the first issuance program after the first threshold condition of the first rule set is met;
issuing, in accordance with the second rule set, one or more second units of the second digital asset of the second asset type to the first account, the one or more second units of the second digital asset of the second asset type being associated with one or more of the second underlying assets, wherein the one or more second units of the second digital asset of the second asset type are issued by the second issuance program after the second threshold condition of the first rule set is met;
associating the one or more first units of the first digital asset of the first asset type with a first transaction between the first account and a second account and recording the association of the one or more first units of the first digital asset of the first asset type in a distributed ledger; and
associating the one or more second asset units of the second digital asset of the second asset type with a second transaction between the first account and a third account and recording the association of the one or more second units of the second digital asset of the second asset type in the distributed ledger.

2. The system of claim 1, wherein the issuing the one or more first units of the first digital asset to the first account and the issuing the one or more second units of the second digital asset to the first account comprise a single transaction on the blockchain.

3. The system of claim 1, wherein the associating the one or more first units of the first digital asset and the associating the one or more second units of the second digital asset comprise a single transaction on the blockchain.

4. The system of claim 1, wherein the corresponding control programs are included in respective outputs of each transaction on the blockchain, the corresponding control programs defining a set of conditions for associating the respective outputs.

5. The system of claim 4, wherein the set of conditions include a condition that the transaction be signed by one or specific cryptographic keys.

6. The system of claim 1, wherein each block of the blockchain comprises a first hash of all transactions batched in that block, and a second hash of a current state of the blockchain.

7. The system of claim 6, wherein each block of the blockchain comprises a consensus program to prevent unauthorized participants from creating new blocks on the blockchain.

8. The system of claim 7, wherein each new block in the block chain satisfies a particular consensus program specified in the header of the previous block in the blockchain prior to being added to the blockchain.

9. The system of claim 7, wherein the consensus program comprises a federated consensus program.

10. The system of claim 1, wherein the issuing the one or more first units of the first digital asset to the first account comprises:
building an issue transaction using the first issuance program corresponding to the first asset identifier;
signing the issue transaction; and
providing the signed issue transaction to the blockchain.

11. The system of claim 1, wherein the associating the one or more first units of the first digital asset comprises:

building a spend transaction using the first issuance program corresponding to the first asset identifier, the spend transaction action including an identifier of the second account;

signing the spend transaction; and providing the signed spend transaction to the blockchain.

12. The system of claim 1, wherein the system is further caused to perform:

retiring the one or more first units of the first digital asset from the first account, thereby removing the one or more first units of the first digital asset from circulation.

13. The system of claim 1, wherein the second account and the third account are the same account.

14. A method implemented by a computing system including one or more physical processors and storage media storing machine-readable instructions, the method comprising:

storing a plurality of different asset objects, a first asset object of the plurality of different asset objects defining at least a first digital asset of a first asset type, the first asset type being associated with a first category of first underlying assets, a second asset object of the plurality of different asset objects defining a second digital asset of a second asset type, the second asset type being associated with a second category of second underlying assets, the first category of first underlying assets being different than the second category of second underlying assets, the first asset type being associated with a first asset identifier corresponding to a first issuance program defining a first rule set for issuing units of the first digital asset on a blockchain, the first rule set including a first threshold condition on a blockchain action, the second asset type being associated with a second asset identifier corresponding to a second issuance program defining a second rule set for issuing units of the second digital asset on the blockchain, the second rule set including a second threshold condition on the blockchain action, the first issuance program being different than the second issuance program, the first rule set being different than the second rule set, the first threshold condition being different than the second threshold condition;

identifying the first issuance program based on the first asset identifier;

identifying the second issuance program based on the second asset identifier;

creating a plurality of accounts, the plurality of accounts including at least a first account, the first account comprising a tracking object that tracks asset ownership using corresponding control programs;

issuing, in accordance with the first rule set, one or more first units of the first digital asset of the first asset type to the first account, the one or more first units of the first digital asset of the first asset type being associated with one or more of the first underlying assets, wherein the one or more first units of the first digital asset of the first asset type are issued by the first issuance program after the first threshold condition of the first rule set is met;

issuing, in accordance with the second rule set, one or more second units of the second digital asset of the second asset type to the first account, the one or more second units of the second digital asset of the second asset type being associated with one or more of the second underlying assets, wherein the one or more second units of the second digital asset of the second asset type are issued by the second issuance program after the second threshold condition of the first rule set is met;

associating the one or more first units of the first digital asset of the first asset type with a first transaction between the first account and a second account and recording the association of the one or more first units of the first digital asset of the first asset type in a distributed ledger; and associating the one or more second units of the second digital asset of the second asset type with a second transaction between the first account and a third account and recording the association of the one or more second units of the second digital asset of the second asset type in the distributed ledger.

15. The method of claim 14, wherein the issuing the one or more first units of the first digital asset to the first account and the issuing the one or more second units of the second digital asset to the first account comprise a single transaction on the blockchain.

16. The method of claim 14, wherein the associating the one or more first units of the first digital asset and the associating the one or more second units of the second digital asset comprise a single transaction on the blockchain.

17. The method of claim 14, wherein the corresponding control programs are included in respective outputs of each transaction on the blockchain, the corresponding control programs defining a set of conditions for associating the respective outputs.

18. The method of claim 17, wherein the set of conditions include a condition that the transaction be signed by one or specific cryptographic keys.

19. The method of claim 14, wherein each block of the blockchain comprises a first hash of all transactions batched in that block, and a second hash of a current state of the blockchain.

20. The method of claim 19, further comprising:

a consensus program comprised in each block of the blockchain preventing unauthorized participants from creating new blocks on the blockchain.

21. The method of claim 20, wherein each new block in the block chain satisfies a particular consensus program specified in the header of the previous block in the blockchain prior to being added to the blockchain.

22. The method of claim 21, wherein the consensus program comprises a federated consensus program.

23. The method of claim 14, further comprising:

retiring the one or more first units of the first digital asset from the first account, thereby removing the one or more first units of the first digital asset from circulation.

24. A non-transitory computer readable medium comprising instructions that, when executed, cause one or more processors to perform:

storing a plurality of different asset objects, a first asset object of the plurality of different asset objects defining at least a first digital asset of a first asset type, the first asset type being associated with a first category of first underlying assets, a second asset object of the plurality of different asset objects defining a second digital asset of a second asset type, the second asset type being associated with a second category of second underlying assets, the first category of first underlying assets being different than the second category of second underlying assets, the first asset type being associated with a first asset identifier corresponding to a first issuance program defining a first rule set for issuing units of the first digital asset on a blockchain, the first rule set including a first threshold condition on a blockchain action, the second asset type being associated with a second asset identifier corresponding to a second issuance program defining a second rule set for issuing units of the second digital asset on the blockchain, the second rule set including a second threshold condition on the blockchain action, the first issuance program being different than the second issuance program, the first rule set being different than the second rule set, the first threshold condition being different than the second threshold condition;

creating a plurality of accounts, the plurality of accounts including at least a first account, the first account comprising a tracking object that tracks asset ownership using corresponding control programs;

identifying the first issuance program based on the first asset identifier;

identifying the second issuance program based on the second asset identifier;

issuing, in accordance with the first rule set, one or more first units of the first digital asset of the first asset type to the first account, the one or more first units of the first digital asset of the first asset type being associated with one or more of the first underlying assets, wherein the one or more first units of the first digital asset of the first asset type are issued by the first issuance program after the first threshold condition of the first rule set is met;

issuing, in accordance with the second rule set, one or more second units of the second digital asset of the second asset type to the first account, the one or more second units of the second digital asset of the second asset type being associated with one or more of the second underlying assets, wherein the one or more second units of the second digital asset of the second asset type are issued by the second issuance program after the second threshold condition of the first rule set is met;

associating the one or more first units of the first digital asset of the first asset type with a first transaction between the first account and a second account and recording the association of the one or more first units of the first asset type in a distributed ledger; and associating the one or more second units of the second digital asset of the second asset type with a second transaction between the first account and a third account and recording the association of the one or more second units of the second digital asset of the second asset type in the distributed ledger.

25. The system of claim 24, wherein the non-transitory computer readable medium causes the one or more processors to further perform:

retiring the one or more first units of the first digital asset from the first account, thereby removing the one or more first units of the first digital asset from circulation.

\* \* \* \* \*